United States Patent
Jung et al.

(10) Patent No.: US 9,661,610 B2
(45) Date of Patent: May 23, 2017

(54) COMMUNICATION METHOD BASED ON AUTOMATIC SERVING CELL MANAGEMENT IN WIRELESS COMMUNICATION SYSTEM, AND DEVICE FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/424,889

(22) PCT Filed: Aug. 29, 2013

(86) PCT No.: PCT/KR2013/007759
§ 371 (c)(1),
(2) Date: Feb. 27, 2015

(87) PCT Pub. No.: WO2014/035154
PCT Pub. Date: Mar. 6, 2014

(65) Prior Publication Data
US 2015/0215900 A1  Jul. 30, 2015

Related U.S. Application Data

(60) Provisional application No. 61/694,777, filed on Aug. 30, 2012.

(51) Int. Cl.
*H04W 72/02* (2009.01)
*H04W 24/10* (2009.01)
(Continued)

(52) U.S. Cl.
CPC ............ *H04W 72/02* (2013.01); *H04L 5/006* (2013.01); *H04L 5/0007* (2013.01); *H04W 24/10* (2013.01); *H04W 72/085* (2013.01)

(58) Field of Classification Search
CPC .... H04W 72/02; H04W 24/10; H04W 72/085
(Continued)

(56) References Cited

U.S. PATENT DOCUMENTS

2005/0221824 A1* 10/2005 Lee ................... H04W 36/0066
                                                    455/435.2
2009/0196196 A1   8/2009 Ghosh et al.
(Continued)

FOREIGN PATENT DOCUMENTS

JP   WO2011098236   *  8/2011  ............ H04W 72/04
KR   10-2011-0081092 A    7/2011
(Continued)

*Primary Examiner* — Ronald B Abelson
(74) *Attorney, Agent, or Firm* — Birch, Stewart, Kolasch & Birch, LLP

(57) ABSTRACT

Disclosed is a communication method performed by a terminal in a wireless communication system. The method comprises: determining whether a serving cell management condition is satisfied; and managing a cell set including at least one serving cell for the terminal according to the satisfied serving cell management condition.

15 Claims, 16 Drawing Sheets

(51) Int. Cl.
*H04W 72/08* (2009.01)
*H04L 5/00* (2006.01)

(58) Field of Classification Search
USPC .................................................. 370/328, 329
See application file for complete search history.

(56) References Cited

U.S. PATENT DOCUMENTS

| | | |
|---|---|---|
| 2009/0257387 A1 | 10/2009 | Gholmieh et al. |
| 2011/0105123 A1 | 5/2011 | Lee et al. |
| 2011/0170420 A1* | 7/2011 | Xi ........................... H04L 5/001 370/241 |
| 2012/0057544 A1* | 3/2012 | Xu ............................ H04L 1/00 370/329 |
| 2012/0147772 A1* | 6/2012 | Kazmi .................. H04L 5/0078 370/252 |
| 2012/0281544 A1* | 11/2012 | Anepu ................. H04B 7/0632 370/241 |
| 2012/0282942 A1* | 11/2012 | Uusitalo ............... H04W 16/14 455/452.2 |
| 2012/0295610 A1* | 11/2012 | Deng .................... H04W 24/10 455/423 |
| 2013/0029666 A1 | 1/2013 | Jung et al. |

FOREIGN PATENT DOCUMENTS

| | | |
|---|---|---|
| WO | WO 2011/093681 A2 | 8/2011 |
| WO | WO 2012/022834 A1 | 2/2012 |

\* cited by examiner

COMMUNICATION METHOD BASED ON AUTOMATIC SERVING CELL MANAGEMENT IN WIRELESS COMMUNICATION SYSTEM, AND DEVICE FOR SUPPORTING SAME

CROSS REFERENCE TO RELATED APPLICATIONS

This application is a National Stage application of a PCT International Application No. PTC/KR2013/007759 on Aug. 29, 2013, which claims the benefit under 35 U.S.C. §119(e) to U.S. Provisional Application No. 61/694,777, filed on Aug. 30, 2012, all of which are hereby expressly incorporated by reference into the present application.

BACKGROUND OF THE INVENTION

Field of the Invention

The present invention relates to wireless communication and, more particularly, to a communication method based on the autonomous serving cell management of user equipment in a wireless communication system and an apparatus for supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In a wireless communication system, various communication methods for providing further improved service are provided. One of the methods is to configure a plurality of serving cells. A method that belongs to methods for configuring a plurality of serving cells and that is taken into consideration is a carrier aggregation. The carrier aggregation is to perform communication using a plurality of carriers of carries supported in a wireless communication system.

When radio resources used by UE are seen from a logical viewpoint, if the UE has a serving cell, additionally configuring carriers for the UE is similar to configuring an additional serving cell that may be used by the UE. In this aspect, a carrier aggregation may be similar to configuring a plurality of serving cells for UE. Accordingly, in providing efficient service to UE through one or more serving cells, a communication method according to a method of managing the serving cell of UE needs to be taken into consideration.

SUMMARY OF THE INVENTION

An object of the present invention is to provide a communication method based on autonomous serving cell management in a wireless communication system and an apparatus for supporting the same.

In an aspect, a communication method performed by user equipment in a wireless communication system is provided. The method comprises determining whether a serving cell management condition is satisfied and managing a cell set comprising at least one serving cell for the user equipment based on a satisfied serving cell management condition.

The serving cell management condition may comprise a first condition for deactivation or deletion and a second condition for activation or addition.

Managing the cell set may comprise deactivating a specific serving cell included in the cell set if the specific serving cell satisfies the first condition.

Managing the cell set may comprise deleting a specific serving cell include in the cell set from the cell set if the specific serving cell satisfies the first condition.

Managing the cell set may comprise activating a specific serving cell that is included in the cell set and that has been deactivated if the specific serving cell satisfies the second condition.

Managing the cell set may comprise including a specific adjacent serving cell in the cell set from the cell set if the specific adjacent serving cell satisfies the second condition.

A specific serving cell included in the serving cell set may satisfy the first condition if measurement quality of the specific serving cell is smaller than a specific threshold.

A specific serving cell included in the serving cell set may satisfy the first condition if measurement quality of the specific serving cell is smaller than measurement quality of another specific serving cell included in the serving cell set by a specific offset.

The first condition may be satisfied if an operation of another Radio Access Technology (RAT) is required for service for the user equipment and the RAT and a specific serving cell of an RAT that now operates are unable to simultaneously operate.

A specific serving cell or specific adjacent cell that is included in the serving cell set and that has been deactivated may satisfy the second condition if measurement quality of the specific serving cell or specific adjacent cell is a specific threshold or more.

A specific serving cell or specific adjacent cell that is included in the serving cell set and that has been deactivated may satisfy the second condition if measurement quality of the specific serving cell or specific adjacent cell is higher than measurement quality of another specific serving cell included in the serving cell set by a specific offset.

The second condition may be satisfied of an operation of another Radio Access Technology (RAT) is stopped for service for the user equipment.

The method may further comprise sending a serving cell management report message according to the serving cell set management to a network. The serving cell management report message may comprise information about an ID of at least one cell whose state has been changed through the serving cell management and information indicative of a serving cell set management reason.

At least one serving cell for the user equipment may be at least one cell configured in the user equipment in order to provide service through a carrier aggregation. The method may further comprise being provided with service through at least one subcarrier from the at least one serving cell included in the cell set.

If a plurality of serving cells included in the cell set is configured in the user equipment, the plurality of serving cells may comprise a single macro cell and at least one small cell. The method may further comprise sending and receiving control information to and from the macro cell and sending and receiving data to and from the at least one small cell.

In another aspect, a wireless apparatus operating in a wireless communication system is provided. The wireless apparatus comprises a Radio Frequency (RF) unit which sends and receives radio signals and a processor which is functionally connected to the RF unit and operates. The processor is configured to determine whether a serving cell management condition is satisfied and manage a cell set comprising at least one serving cell for the wireless apparatus based on a satisfied serving cell management condition.

In accordance with the communication method according to an embodiment of the present invention, UE can autonomously manage serving cells based on a service environment including serving cells and/or adjacent cells. Accordingly, serving cells suitable for providing service to UE can be adaptively configured. This enables further improved and efficient service to be provided to the UE through the configuration of one or more serving cells. Furthermore, UE can autonomously manage serving cells by determining whether or not to provide service through another RAT based on the capabilities of the UE. Accordingly, when service is provided through another RAT, LTE cells can be prevented from being unnecessarily configured as serving cells and waiting, thereby being capable of a more efficient network operation.

DESCRIPTION OF EXEMPLARY EMBODIMENTS

Figure 1:
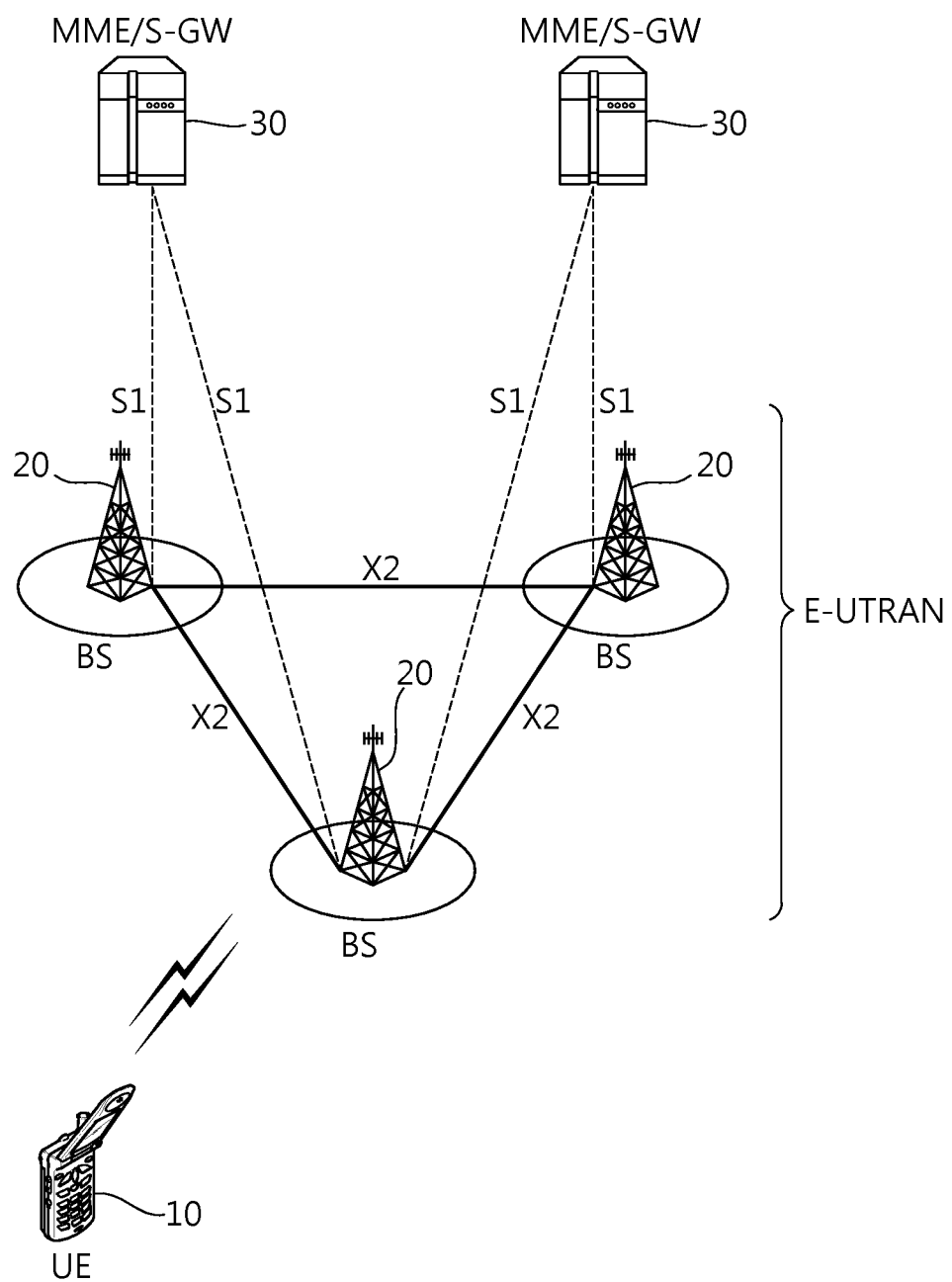
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
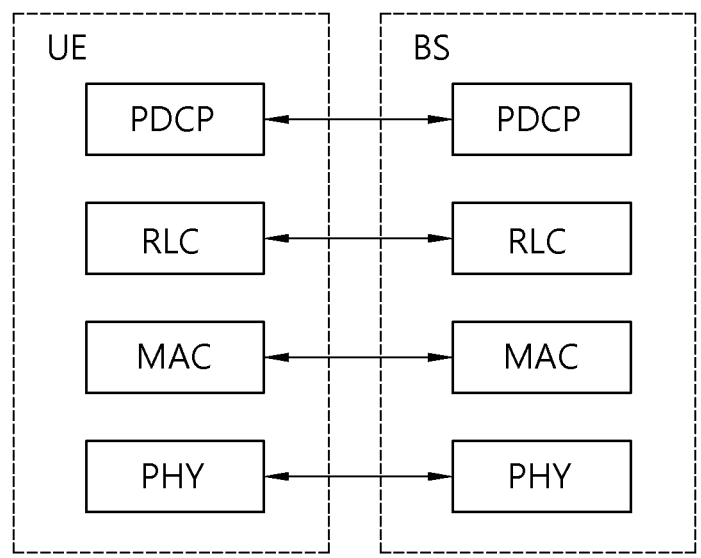
FIG. 2 is a block diagram showing the structure of a wireless protocol on the user plane.
Figure 3:
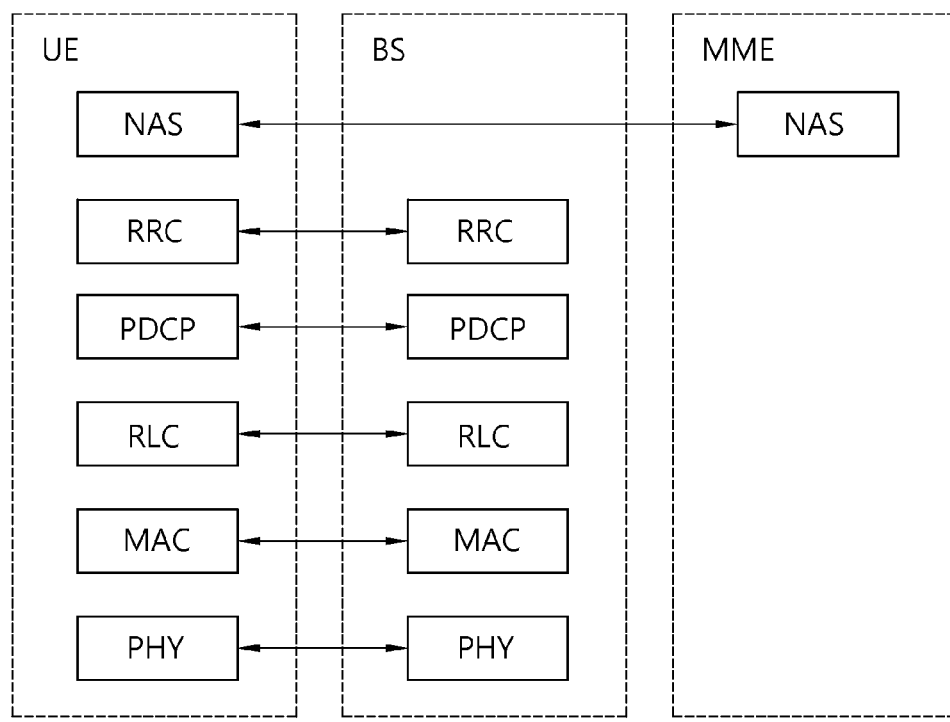
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
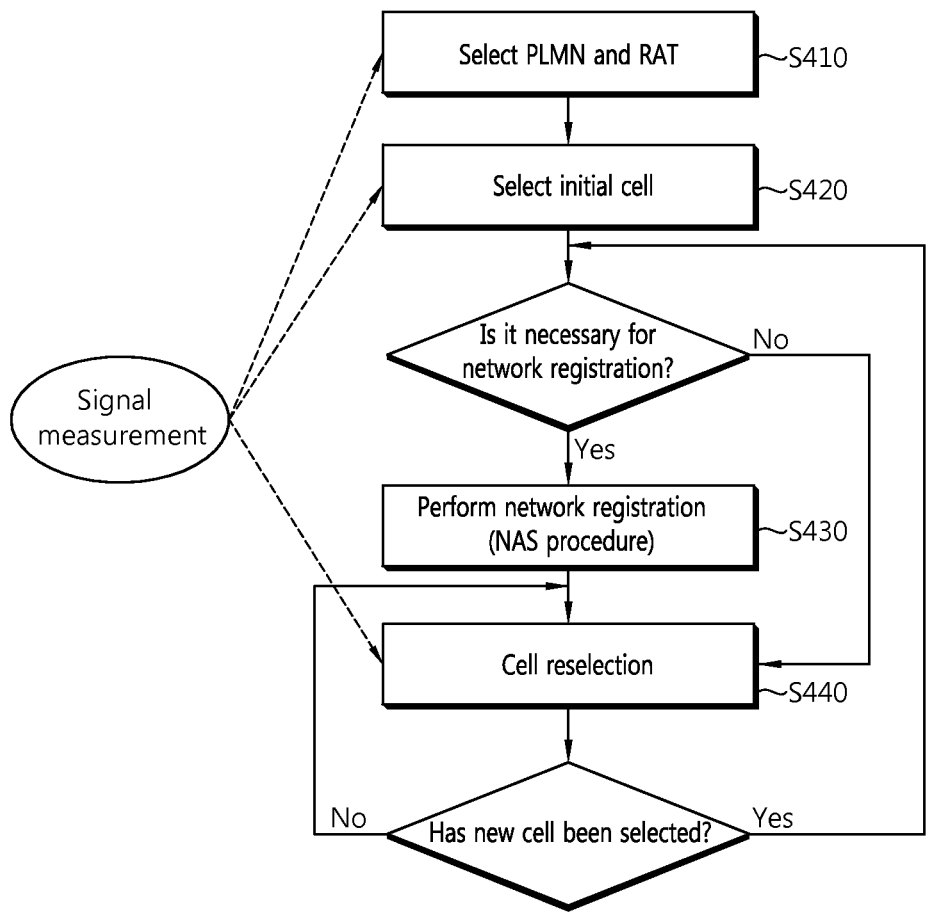
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
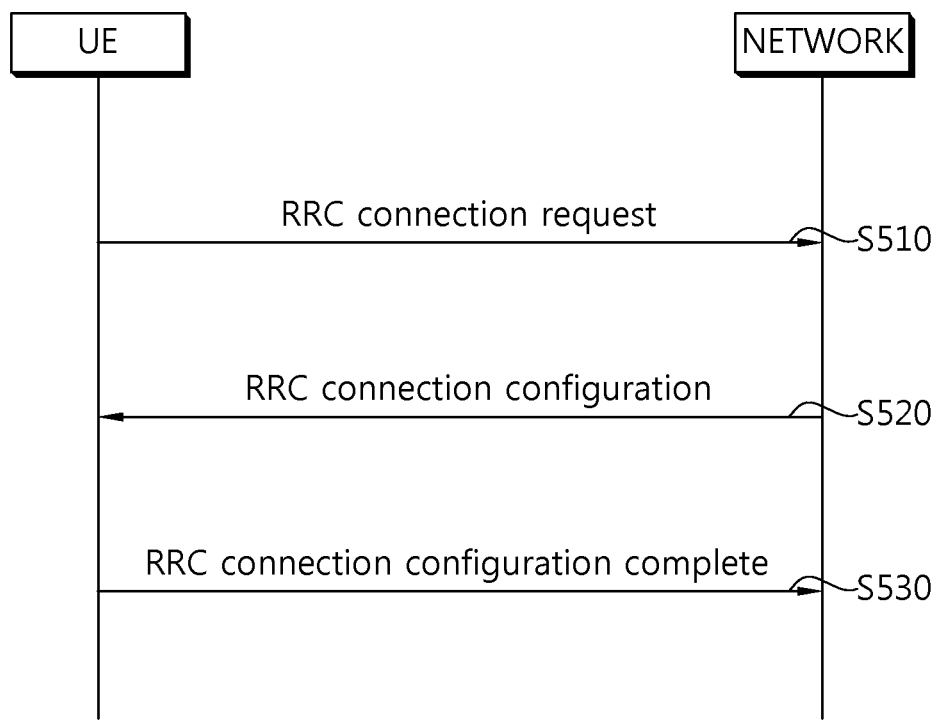
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
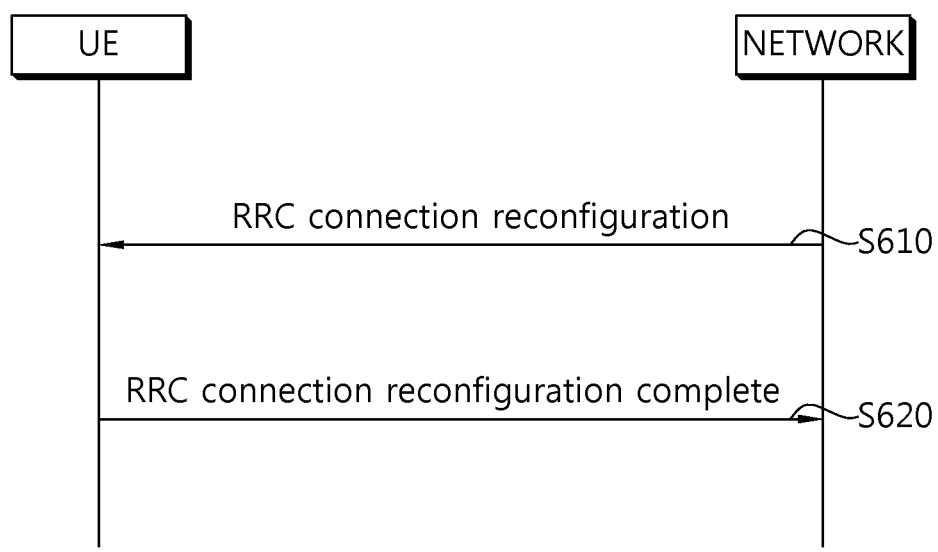
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

A Public Land Mobile Network (PLMN) is described below.

The PLMN is a network deployed and managed by a mobile network operator.

Each mobile network operator manages one or more PLMNs. Each PLMN may be identified by Mobile Country Code (MCC) and Mobile Network Code (MNC). Information about the PLMN of a cell is included in system information and broadcasted.

In PLMN selection, cell selection, and cell reselection, UE may take into consideration various types of PLMNs.

A Home PLMN (HPLMN): a PLMN having MCC and MNC matched with those of a UE IMSI.

An Equivalent HPLMN (EHPLMN): a PLMN equivalently treated as an HPLMN.

A Registered PLMN (RPLMN): a PLMN whose location has been successfully registered.

An Equivalent PLMN (EPLMN): a PLMN equivalently treated as an RPLMN.

Each mobile service demander joins an HPLMN. When an HPLMN or an EHPLMN provides UE with common service, the UE is not in a roaming state. In contrast, a PLMN provides UE with service in addition to an HPLMN/EHPLMN, the UE is in a roaming state, and the PLMN is called a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

A procedure of selecting, by UE, a cell is described in detail below.

When UE is powered on or camps on a cell, the UE performs procedures for selecting/reselecting a cell having proper quality and being provided with service.

UE in the RRC idle state needs to always select a cell having proper quality and to be prepared to be provided with service through the cell. For example, UE that is initially powered on needs to select a cell having proper quality in order to register it with a network. If UE in the RRC connection state enters the RRC idle state, the UE needs to select a cell on which the UE will camp in the RRC idle state. As described above, a process of selecting, by UE, a cell that satisfies some conditions in order to camp on in a service standby state, such as the RRC idle state, is called cell selection. An important point is that the cell rapidly selects a cell because cell selection is performed in the state in which the UE has not determined a cell on which the UE will camp in the RRC idle state. Accordingly, if a cell is a cell that provides the quality of a radio signal of a specific reference or higher, the cell may be selected in the cell selection process of UE although the cell is not a cell that provides the best radio signal quality to the U.

A method and procedure in which UE selects a cell in 3GPP LTE is described in detail with reference to 3GPP TS 36.304 V8.5.0 (2009-03) "User Equipment (UE) procedures in idle mode (Release 8)."

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a reference value for evaluating cell reselection and numbering cells using reference values according to the size of the reference values. A cell having the best criterion is commonly called the best ranked cell. The cell reference value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through LTE-dedicated signaling. Cell reselection priority provided through broadcast signaling may be called common priority, and cell reselection priority set by a network for each piece of UE may be called dedicated priority. When receiving dedicated priority, UE may also receive a validity time related to the dedicated priority. When receiving the dedicated priority, the UE initiates a validity timer set to the validity time received along with the dedicated priority. While the validity timer operates, the UE applies the dedicated priority in RRC idle mode. When the validity timer expires, the UE discards the dedicated priority and applies common priority again.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation I.

$$R_s = Q_{meas,s} + Q_{hyst},\ R_n = Q_{meas,s} - Q_{offset}$$

In this case, $R_s$ is the ranking criterion of a serving cell, $R_n$ is the ranking criterion of a neighbor cell, $Q_{meas,s}$ is the quality value of the serving cell measured by UE, $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbor cell, $Q_{offset} = Q_{offsets,n}$. If UE does not $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_S$ of a serving cell and $R_n$ of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values Qout and Qin. The threshold value Qout is defined as a level at which a downlink radio link is unable to be stably received, which corresponds to a block error rate of 10% of hypothetical PDCCH transmission by taking into consideration a PDFICH error. The threshold value Qin is defined as a downlink radio link quality level at which a downlink radio link is able to be more stably received than compared to the level of Qout, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
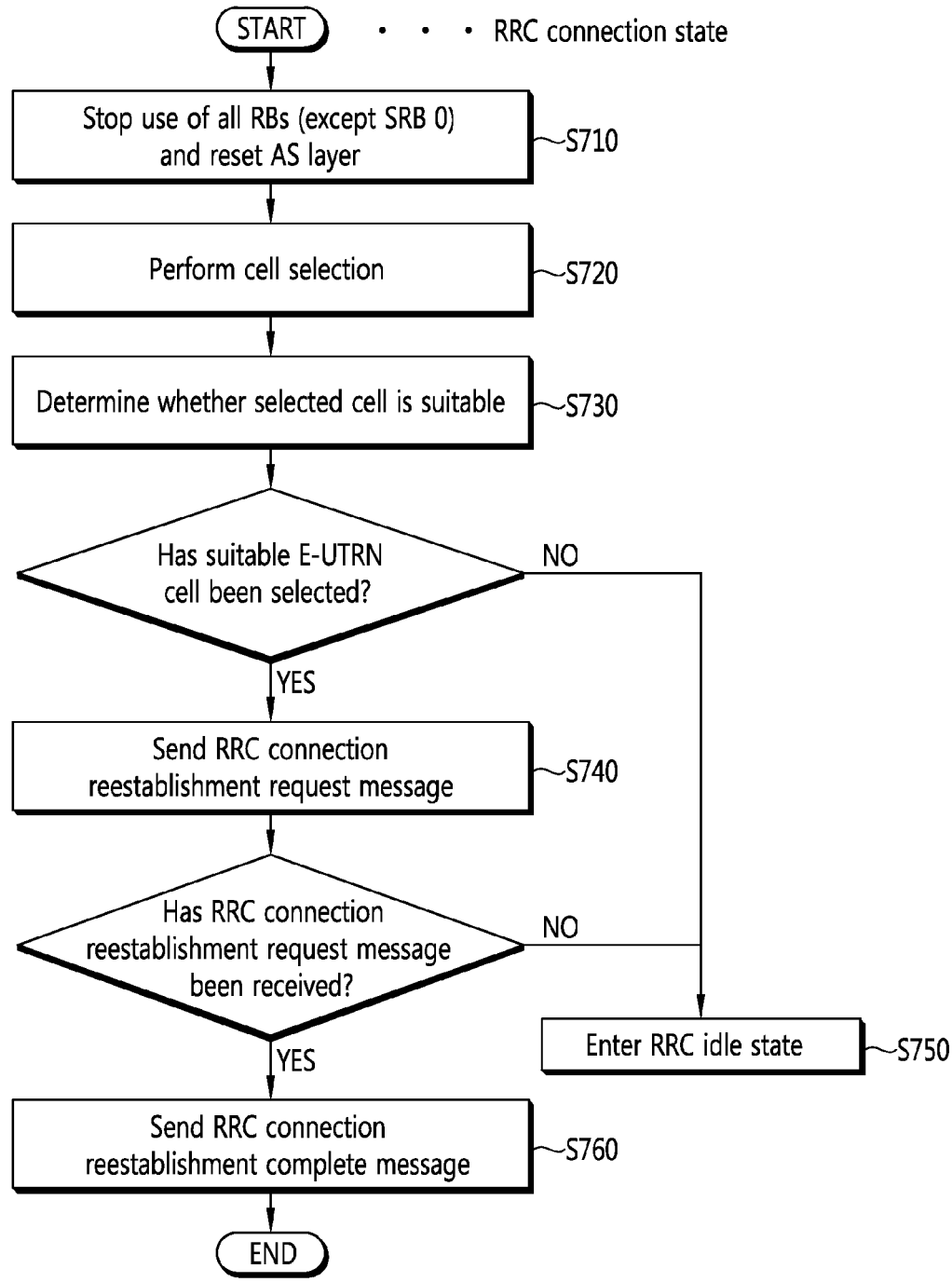
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure, Wireless measurements.

The location of a failure.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure.

Measurement and a measurement report are described below.

In a mobile communication system, to support the mobility of UE is essential. Accordingly, the UE continues to measure the quality of a serving cell from which the UE is now provided with service and the quality of a neighbor cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighboring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighboring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a heterogeneous network, the UE may measure the cell of a heterogeneous network according to a BS configuration. The measurement of such a heterogeneous network is called inter-Radio Access Technology (RAT) measurement. For example, RAT may include an UMTS Terrestrial Radio Access Network (UTRAN) and a GSM EDGE Radio Access Network (GERAN) that comply with the 3GPP standard, and may also include CDMA 2000 systems that comply with the 3GPP2 standard.

Figure 8:
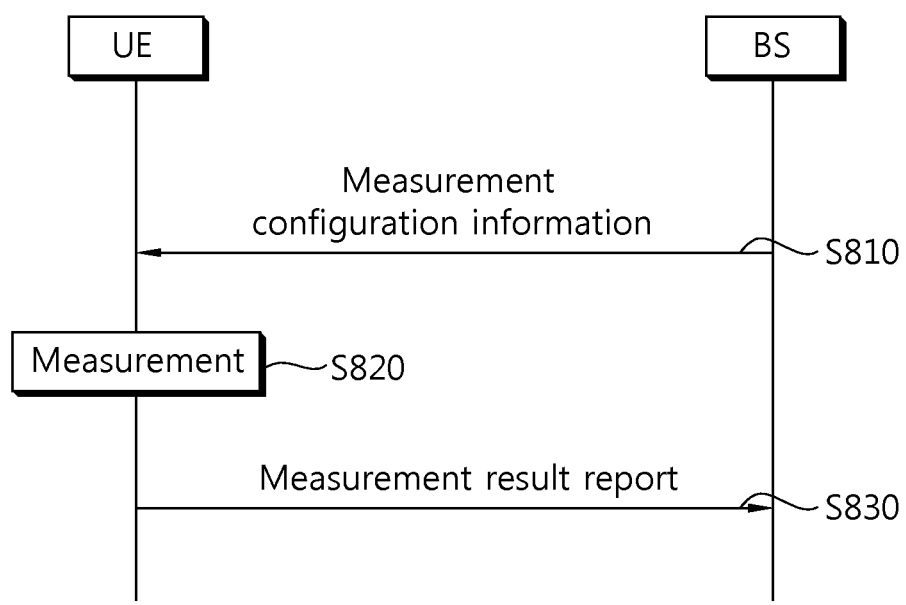
FIG. 8 is a flowchart illustrating a method of performing measurement.

FIG. 8 is a flowchart illustrating a method of performing measurement.

UE receives measurement configuration information from a BS (S810). A message including the measurement configuration information is called a measurement configuration message. The UE performs measurements based on the measurement configuration information (S820). If measured results satisfy report conditions within the measurement configuration information, the UE reports the measured results to the BS (S830). A message including the measured results is called a measurement report message.

The measurement configuration information may include the following information.

(1) Measurement object information: it is information about the object on which UE will perform measurement. A measurement object includes at least one of an intra-frequency measurement object that is the object of measurement within a cell, an inter-frequency measurement object that is the object of measurement between cells, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a frequency band different form that of a serving cell, and the inter-RAT measurement object may indicate a neighboring cell having RAT different from that of a serving cell.

(2) Reporting configuration information: this is information about a report condition regarding the time when UE reports a measured result and a report type. The report configuration information may consist of a list of report configurations. Each report configuration may include a report criterion and a report format. The report criterion is a criterion that triggers the transmission of a measured result by UE. The report criterion may be the cycle of a measurement report or a single event for a measurement report. The report format is information about that UE will configure a measured result using what type.

(3) Measurement ID information: this is information about a measurement identity that associates a measurement object with a reporting configuration so that UE determines to report what measurement object when and in what type. The measurement ID information may be included in a measurement report message and may be indicative that a measured result is about which measurement object and that a measurement report has occurred due to what report condition.

(4) Quantity configuration information: this is information about a parameter for setting the filtering of a measurement unit, a report unit and/or a measured result value.

(5) Measurement gap information: this is information about a measurement gap, that is, a section that may be used for UE to perform only measurement by not taking into consideration data transmission with a serving cell because downlink transmission or uplink transmission has not been scheduled.

In order to perform a measurement procedure, UE has a measurement object list, a measurement report configuration list, and a measurement identity list.

In 3GPP LTE, a BS may configure only one measurement object for a single frequency band in relation to UE. In accordance with Paragraph 5.5.4 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table.

TABLE 1

| Event | Report Conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measured results of UE satisfy a set event, the UE sends a measurement report message to a BS.

Figure 9:
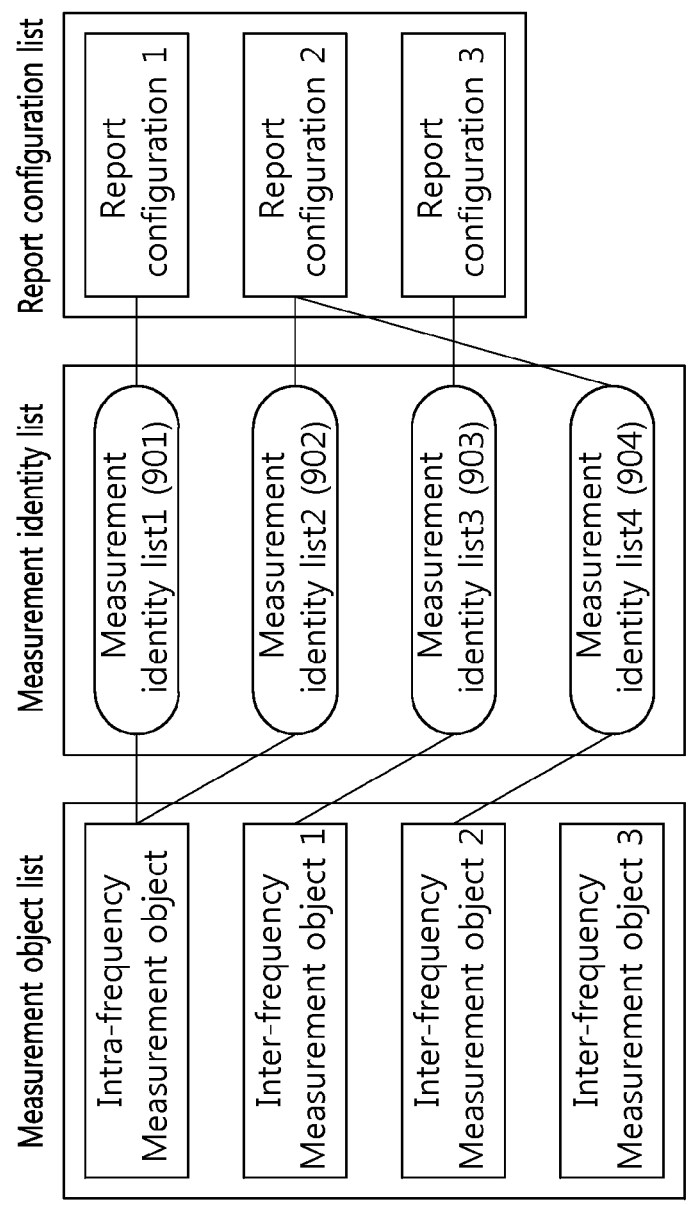
FIG. 9 illustrates an example of a measurement configuration configured to UE.

FIG. 9 illustrates an example of a measurement configuration configured to UE.

First, a measurement identity 1 901 connects an intra-frequency measurement object and a reporting configuration 1. UE performs intra-cell measurement (intra-frequency measurement), and the reporting configuration 1 is used to determine the criterion of a measurement result report and a report type.

A measurement identity 2 902 is connected to the intra-frequency measurement object like the measurement identity 1 901, but it connects the intra-frequency measurement object to a reporting configuration 2. UE performs measurement, and the reporting configuration 2 is used to determine the criterion of a measurement result report and a report type.

In accordance with the measurement identity 1 901 and the measurement identity 2 902, UE sends the measured results of the intra-frequency measurement object although the measured results satisfy any one of the reporting configuration 1 and the reporting configuration 2.

A measurement identity 3 903 connects an inter-frequency measurement object 1 and a reporting configuration 3. UE reports the measured results of the inter-frequency measurement object 1 if the measured results satisfy report conditions included in the reporting configuration 1.

A measurement identity 4 904 connects an inter-frequency measurement object 2 and the reporting configuration 2. UE reports the measured results of the inter-frequency measurement object 2 if the measured results satisfy report conditions included in the reporting configuration 2.

Meanwhile, a measurement object, a reporting configuration and/or a measurement identity may be added, changed and/or deleted. This may be indicated in such a manner that a BS sends a new measurement configuration message to UE or sends a measurement configuration change message to the UE.

Figure 10:
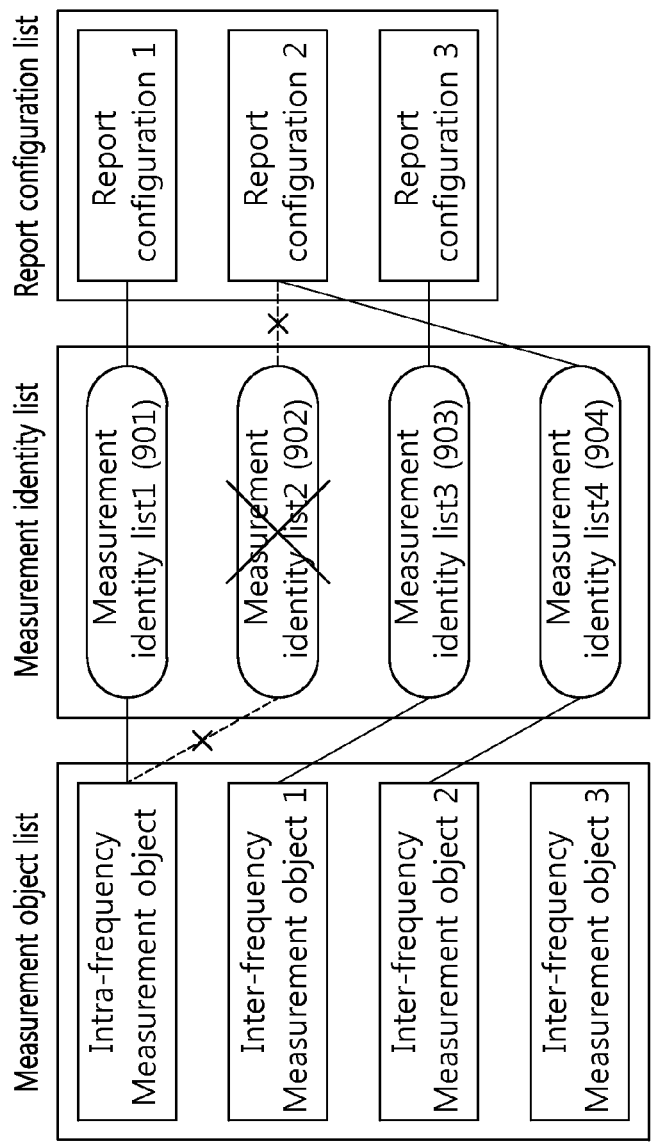
FIG. 10 illustrates an example in which a measurement identity is deleted.

FIG. 10 illustrates an example in which a measurement identity is deleted. When a measurement identity 2 902 is deleted, the measurement of a measurement object associated with the measurement identity 2 902 is stopped, and a measurement report is not transmitted. A measurement object or a reporting configuration associated with a measurement identity may not be changed.

Figure 11:
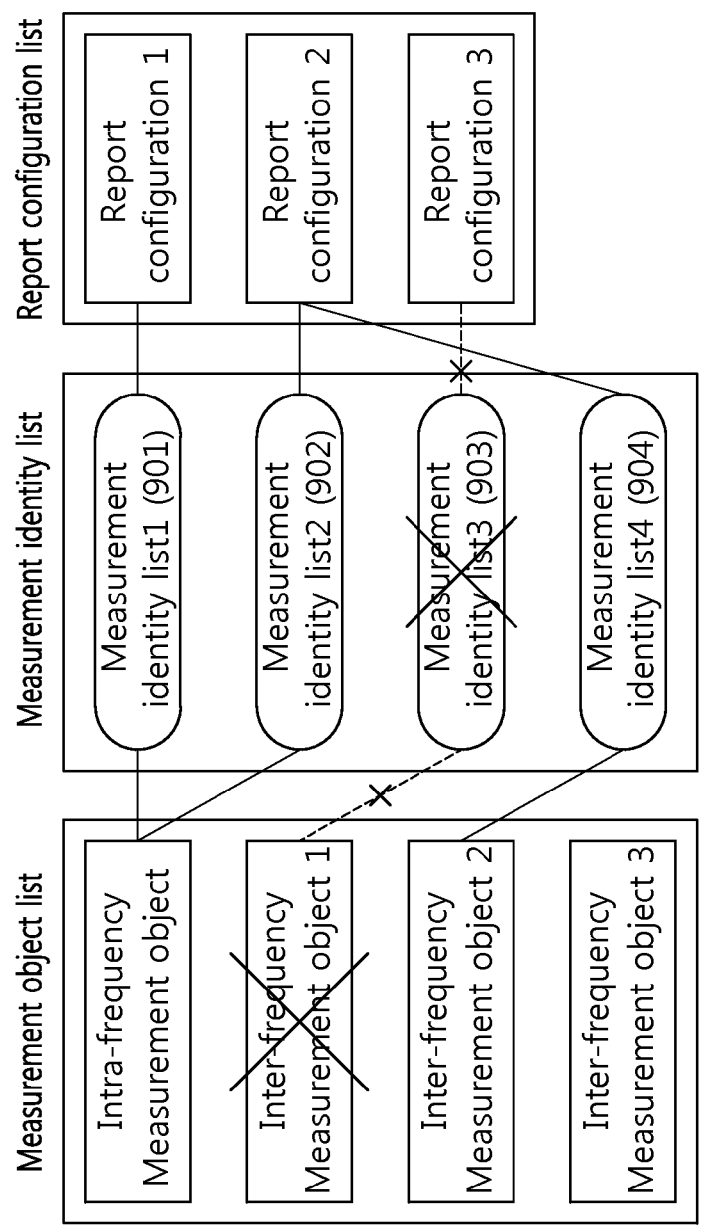
FIG. 11 illustrates an example in which a measurement object is deleted.

FIG. 11 illustrates an example in which a measurement object is deleted. When an inter-frequency measurement object 1 is deleted, UE also deletes an associated measurement identity 3 903. The measurement of the inter-frequency measurement object 1 is stopped, and a measurement report is not transmitted. However, a reporting configuration associated with the deleted inter-frequency measurement object 1 may not be changed or deleted.

When a reporting configuration is removed, UE also removes an associated measurement identity. The UE stops the measurement of a measurement object associated by the associated measurement identity. However, a measurement object associated with a deleted reporting configuration may not be changed or deleted.

A measurement report may include a measurement identity, the measured quality of a serving cell, and the measured results of a neighboring cell. A measurement identity identifies a measurement object whose measurement report has been triggered. The measured results of a neighboring cell may include the cell identity and measured quality of the neighboring cell. Measured quality may include at least one of Reference Signal Received Power (RSRP) and Reference Signal Received Quality (RSRQ).

Hereinafter, a carrier aggregation scheme supported in wireless communication systems is described.

LTE-A is an IMT-Advanced candidate technology of the International Telecommunication Union (ITU) and has been designed to comply with the IMT-Advanced technical requirements of the ITU. Accordingly, in LTE-A, in order to satisfy the requirements of the ITU, the extension of the bandwidth compared to existing LTE systems is being discussed.

Figure 12:
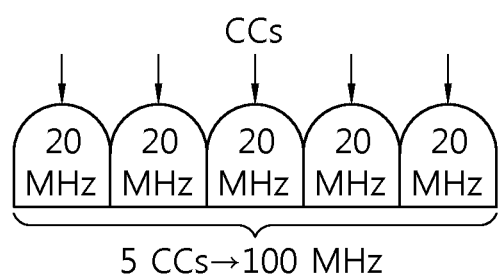
FIG. 12 is a diagram illustrating an example of a carrier aggregation scheme.

FIG. 12 is a diagram illustrating an example of a carrier aggregation scheme.

In LTE-A systems, in order to extend the bandwidth, carriers that may be present in existing LTE systems are defined as a component carrier (CC), and to use a maximum of 5 CCs is being discussed. A CC can be extended up to a maximum of a 100 MHz bandwidth if 5 CCs are used because the CC may have a maximum of a 20 MHz bandwidth as in an LTE system. To use a plurality of CC as described above is called a carrier aggregation scheme.

From a logical viewpoint of radio resources used by UE, additionally configuring CCs for a carrier aggregation may be considered to be similar to configuring additional serving cells for the UE in addition to an existing serving cell. That is, configuring a plurality of CCs for UE is logically similar to configuring a plurality of serving cells for the UE. UE can be provided with service from a plurality of serving cells. Basically, a serving cell may be called a PCell, and a cell for a carrier aggregation may be called an SCell. Accordingly, a CC that is additionally configured may also be represented by an SCell, that is, a serving cell that is additionally configured.

For a communication operation through a carrier aggregation, UE may need to obtain information about an SCell for the carrier aggregation from a network. Carrier aggregation configuration information may include system information (system information about a cell that may be configured as an SCell) for a CC and parameter information related to a variety of types of other CC operations.

In order for a network to additionally configure a serving cell for UE, an RRC connection reestablishment procedure may be used. The network may include carrier aggregation configuration information, including information about an SCell to be additionally configured, in an RRC connection reestablishment message and send the RRC connection reestablishment message to the UE. The UE that has received the message may have the serving cell additionally configured through the carrier aggregation configuration information and perform communication based on the additionally configured serving cell.

Meanwhile, a change of a serving cell and the deletion of a serving cell in addition to the addition of a serving cell may also be performed through the RRC connection reestablishment procedure.

To enable reasonable UE battery consumption in configuring a carrier aggregation for UE, the activation/deactivation mechanism of an SCell may be supported. In a carrier aggregation, however, there is no room for applying the activation or deactivation of a PCell. If an SCell is deactivated, UE is unable to perform corresponding uplink transmission or is not required to perform CQI measurement because it is no longer able to receive a corresponding PDCCH and/or PDSCH. In contrast, if an SCell is activated, UE needs to receive a PDSCH and PDCCH (if the UE has been configured to monitor a PDCCH from a corresponding SCell) and may be expected to perform CQI measurement.

This SCell activation/deactivation mechanism may be based on MAC control elements and deactivation timers. The MAC control elements include a bitmap the activation and deactivation of SCells. A bit set to '1' indicates that a corresponding SCell is activated, and a bit set to '0' indicates that a corresponding SCell is deactivated. The SCells may be individually activated and deactivated along with the bitmap. Single activation/deactivation indication may indicate activation/deactivation for some SCell sets of the SCells. The deactivation timer is maintained in each SCell, but may be set to a common value for each piece of UE through RRC.

In an RRC connection reestablishment procedure not related to handover (if an RRC connection reestablishment message not including mobility control information is received), an SCell may be initially deactivated and added to a serving cell set. Furthermore, the activation set of SCells present in the serving cell set is not changed.

In an RRC connection reestablishment procedure according to handover (if an RRC connection reestablishment message including mobility control information is received), SCells are deactivated.

A plurality of cells having the same frequency may be configured in UE in addition to a carrier aggregation. For example, a macro cell and a small cell in the same frequency may be configured in UE. The UE may attempt stable mobility performance for the UE, the improvement of UE data speed, and network load balancing using a method for sending and receiving mobility-related control information, other control information, and user data, if necessary, through the macro cell and sending and receiving user data usually through the small cell. If a macro cell and a small cell are simultaneously configured in UE, a cell (e.g., a macro cell) that leadingly receives mobility-related control information and other control information may be considered to be a PCell, and a small cell (e.g., a femto cell or a pico cell) that leadingly receives mobility-related control information and other control information may be considered to be an SCell.

Meanwhile, while a plurality of serving cells is configured as described above and UE operates, if the UE may not maintain the existing serving cells or performance of the UE is deteriorated if the existing serving cells are maintained compared to a case where the existing serving cells are not maintained, the UE may preferably manage serving cells. As described above, if the addition/deletion of serving cells and/or the activation/deactivation of serving cells are performed during an RRC connection reestablishment procedure and performed based on indication from a network, UE may not actively manage the serving cells when the serving cells are required to be managed. This is contrary to an object of providing further improved communication quality through a carrier aggregation and may generate a problem in which performance is deteriorated. Accordingly, there is a need for a communication method which enables UE to determine a need for serving cell management and autonomously manage serving cells based on a result of the determination.

Figure 13:
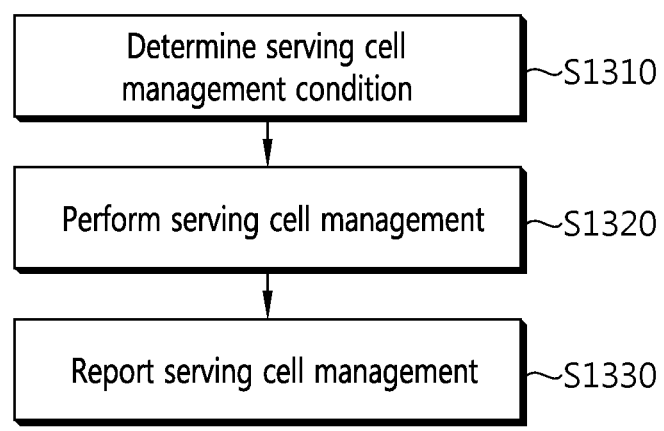
FIG. 13 is a diagram illustrating a communication method based on autonomous serving cell management in accordance with an embodiment of the present invention.

FIG. 13 is a diagram illustrating a communication method based on autonomous serving cell management in accordance with an embodiment of the present invention.

Referring to FIG. 13, UE determines whether a serving cell management condition has been satisfied (S1310). It is preferred that UE autonomously performs the management of serving cells only when a specific condition is satisfied. The serving cell management condition may include a first condition for the deletion/deactivation of a serving cell and a second condition for the addition/activation of a serving cell. If the first condition is satisfied, the UE may stop to use a corresponding cell by deactivating a specific serving cell or excluding the specific serving cell from a serving cell set for a carrier aggregation. If the second condition is satisfied, the UE may start/restart the use of a corresponding serving cell by activating a specific serving cell of a deactivation state that belongs to a serving cell set for a carrier aggregation or adding other serving cells to a serving cell set for a carrier aggregation.

The first condition relating to the deletion/deactivation of a serving cell may be as follows.

1. Conditions Related to Quality of a Serving Cell

1) A case where a measurement value is a threshold or less as a result of the measurement of a configured serving cell by UE.

The measurement result may be RSRP, RSRQ. The measurement result may be a CQI value.

The threshold may be a value predetermined for the UE. The threshold may be a value received from a network.

2) A case where a measurement value is lower than a measurement value of another specific serving cell now configured in UE by an offset as a result of the measurement of the configured serving cell.

The measurement result may be RSRP, RSRQ. The measurement result may be a CQI value.

Another specific serving cell may be a serving cell predetermined for the UE. Another specific serving cell may be a PCell. Another specific serving cell may be a serving cell designated by a network.

The offset may be a value predetermined for the UE. The offset may be a value received from a network.

2. A Condition Relating to the Capabilities of UE

A case where UE needs to stop/deactivate the operation of some of serving cells now configured for the operation of another RAT within UE.

If UE may not simultaneously perform the operation of the UE and the operation of another RAT through all the serving cells now configured due to the limit of RF capabilities or the baseband processing capability of the UE, the UE may deactivate the operation of some serving cells and thus perform the operation of another RAT.

For example, when UE for which two LTE serving cells have been configured starts to use a UMTS RAT for voice or other service, if the use of the UMTS RAT is started, one of the configured two serving cells may not be used due to the limit of the capabilities of the UE.

The second condition related to the addition/activation of a serving cell may be as follows.

1. Conditions Related to Quality of a Cell

1) A case where a measurement value is a threshold or more as a result of the measurement of a serving cell whose use has been deactivated by UE.

The measurement result may be RSRP, RSRQ. The measurement result may be a CQI value.

The threshold may be a value predetermined for the UE. The threshold may be a value received from a network.

2) A case where a measurement value is a threshold or more as a result of the measurement of an adjacent cell by UE.

The measurement result may be RSRP, RSRQ. The measurement result may be a CQI value.

The threshold may be a value predetermined for the UE. The threshold may be a value received from a network.

3) A case where a measurement value is greater than a measurement value of another specific serving cell now configured in UE by offset as a result of the measurement of a serving cell whose use has been deactivated by the UE.

The measurement result may be RSRP, RSRQ. The measurement result may be a CQI value.

Another specific serving cell may be a serving cell predetermined for the UE. Another specific serving cell may be a PCell. Another specific serving cell may be a serving cell designated by a network.

The offset may be a value predetermined for the UE. The offset may be a value received from a network.

4) A case where a measurement value is greater than a measurement value of another specific serving cell now configured in UE by an offset as a result of the measurement of an adjacent cell by the UE.

The measurement result may be RSRP, RSRQ. The measurement result may be a CQI value.

Another specific serving cell may be a serving cell predetermined for the UE. Another specific serving cell may be a PCell. Another specific serving cell may be a serving cell designated by a network.

The offset may be a value predetermined for the UE. The offset may be a value received from a network.

2. Conditions Related to the Capabilities of UE

A case where the use of a corresponding RAT is terminated and the use of a stopped serving cell has been able to be started while the operation of UE is deactivated in order to perform the operation of another RAT within the UE.

If UE may not simultaneously perform the operation of the UE and the operation of another RAT through all the serving cells now configured due to the limit of RF capabilities or the baseband processing capability of the UE, the UE may deactivate the operation of some serving cells and thus perform the operation of another RAT. Thereafter, if the operation of a corresponding RAT is terminated and the operation of a stopped serving cell is able to be resumed, the UE may autonomously activate a corresponding serving cell.

For example, if UE for which two LTE serving cells have been configured starts the use of a UMTS RAT for voice service and an UMTS RAT is no longer able to be used because the service through the UMTS RAT is terminated after the UE autonomously stops to use a corresponding serving cell, the UE may autonomously activate the deactivated LTE serving cell.

Referring back to FIG. 13, if the serving cell management condition is determined to be satisfied, the UE autonomously performs serving cell management because the condition has been satisfied (S1320). Whether the first condition is satisfied may be taken into consideration in relation to deletion/deactivation, and whether the second condition is satisfied may be taken into consideration in relation to addition/activation.

The autonomous management of a serving cell performed by UE may include deleting a specific serving cell from a serving cell set or adding a new serving cell to the serving cell set. The UE may manage serving cells in such a way as to delete or add the configuration of a specific serving cell for a carrier aggregation within the UE.

UE may add a specific adjacent cell that has satisfied a specific condition as a serving cell even without a direct instruction that requests a new serving cell to be added from a network. When UE adds a new cell as a serving cell, the UE may configure a corresponding serving cell using a basic configuration previously stored in the UE. The basic configuration may be configuration previously received from a network and/or a configuration previously set between the UE and a network.

UE may delete a serving cell that has satisfied a specific condition even without a direct instruction that requests an existing serving cell to be deleted from a network. When deleting a serving cell, UE may store configuration information for a serving cell that may be applied when subsequently adding a serving cell.

The autonomous management of a serving cell performed by UE may include deactivating a corresponding cell (stopping to use the corresponding cell) in the state in which the configuration of the corresponding cell has been maintained with respect to a specific serving cell or activate the corresponding cell.

UE may activate a serving cell that has satisfied a specific condition even without a direct instruction that requests the use of a specific serving cell that has been deactivated to be activated from a network.

UE may deactivate a serving cell that has satisfied a specific condition even without a direct instruction that requests the use of a specific serving cell to be deactivated from a network.

The UE that has performed the serving cell management reports a result of the serving cell management to a network (S1330).

If UE has autonomously deactivated a specific serving cell or deleted a specific serving cell from a serving cell set, the UE may report it to a network. The UE may include the identifier of the serving cell that has been deactivated in a report message. The UE may include the identifier of the deleted specific cell in the report message.

If UE has autonomously activated a specific serving cell or added a specific adjacent cell to a serving cell set as a serving cell, the UE may report it to a network. The UE may include the identifier of the serving cell that has been activated in a report message. The UE may include the identifier of the added specific cell in the report message. In autonomously adding the serving cell, if the UE has used a basic configuration that has been previously obtained from a network or previously configured, the UE may include information related to the basic configuration in a serving cell management report message. For example, in adding the serving cell, the UE may include information, indicating that the serving cell has been added through the basic configuration, in the serving cell management report message.

If UE has autonomously performed serving cell management through the activation/deactivation/deletion/addition of a cell, the UE may also report a serving cell management reason in reporting the serving cell management to a network.

If UE has autonomously performs serving cell management, the UE may report information about a serving cell management operation to a network through a serving cell not related to the management operation. That is, the UE may report information about a cell management operation to a network through another serving cell not related to an activated/deactivated/deleted/added cell. For example, the UE may perform the serving cell management report through a PCell.

In applying the communication method based on autonomous serving cell management in accordance with an embodiment of the present invention, the operation of UE in accordance with an embodiment of the present invention may be performed only when the execution of the autonomous serving cell management is permitted by a network. The permission of the autonomous serving cell management may include allowing UE to autonomously add/delete/activate/deactivate a serving cell. The permission of the autonomous serving cell management includes allowing the deactivation/deletion of a serving cell to be autonomously performed. In this case, the activation/addition of the serving cell is unable to be autonomously performed by the UE. The permission of the autonomous serving cell management includes allowing the activation/addition of a serving cell to be autonomously performed. In this case, the deactivation/deletion of the serving cell is unable to be autonomously performed by the UE. The permission of the autonomous serving cell management may include allowing autonomous serving cell management for only an indicated specific one or more serving cells. The permission of the autonomous serving cell management may include allowing autonomous serving cell management for all the SCells.

UE receives a configuration related to the permission of the aforementioned autonomous serving cell management. If a configuration value regarding the aforementioned condition is received from a network, the UE may determine that autonomous serving cell management has been permitted.

UE may receive a cell ID list, that is, the subject of autonomous serving cell management, from a network. The UE that has obtained the cell ID list may detect a cell included in the cell ID list through adjacent cell measurement. If the second condition of the cell is satisfied, the UE may add a corresponding adjacent cell as a serving cell. Meanwhile, the UE may not add a cell that belongs to adjacent cells and that is not included in the cell list as a serving cell.

UE may receive configuration information for a serving cell that will be used when performing an operation for adding the serving cell through autonomous serving cell management from a network. The UE that has received the corresponding configuration information may configure the corresponding serving cell by applying the received configuration information when adding the corresponding serving cell.

In performing a communication method based on the aforementioned autonomous serving cell management, a serving cell, that is, the subject of the serving cell management, may be limited to an SCell. That is, UE may exclude a PCell from the subject of the serving cell management.

A detailed example of a communication method based on the autonomous serving cell management is described below with reference to drawings.

Figure 14:
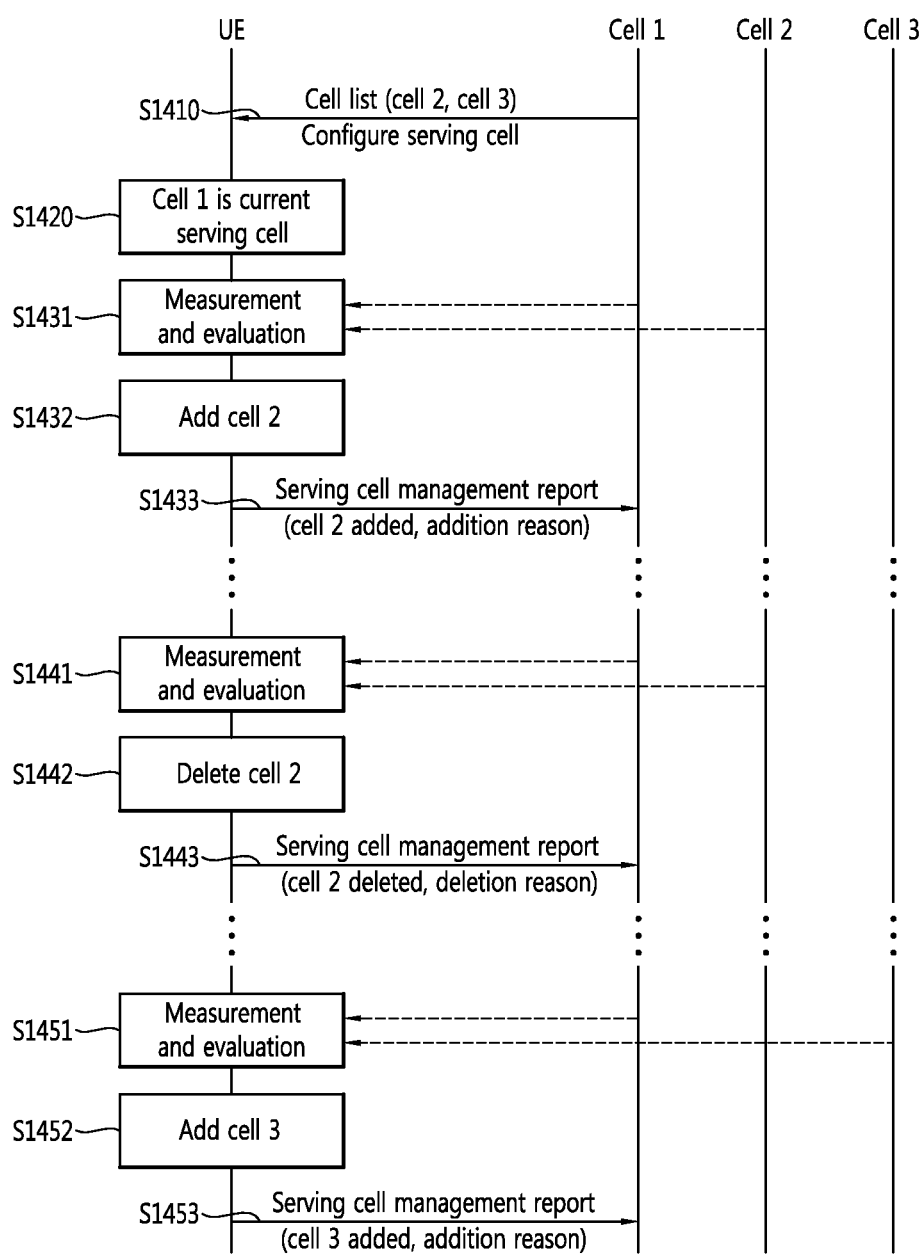
FIG. 14 is a diagram illustrating an example of a communication method based on autonomous serving cell management in accordance with an embodiment of the present invention.

FIG. 14 is a diagram illustrating an example of a communication method based on autonomous serving cell management in accordance with an embodiment of the present invention.

In this example, an embodiment of the present invention is described by taking a process of adding/deleting a serving cell as an example in the autonomous serving cell management of UE.

Referring to FIG. 14, UE obtains serving cell configuration information from a network (S1410). The serving cell configuration information may include a list of target cells on which the UE may autonomously perform serving cell management. The UE may perform autonomous serving cell management on the cells included in the cell list. In this example, the serving cell configuration information has been illustrated as including a cell list including a cell 2 and a cell 3.

The UE may obtain the serving cell configuration information through a process of establishing/reestablishing/configuring RRC connection with a network. Alternatively, the serving cell configuration information may be included in information about a specific cell and/or a configuration message and transmitted.

The UE operates using the cell 1 as a serving cell (S1420). Accordingly, the cell 1 may operate as the PCell of the UE.

The UE performs measurement and evaluation on the serving cell and an adjacent cell (S1431). The UE may obtain the measurement quality (e.g., RSRQ, RSRP and/or a CQI) of the serving cell and/or the adjacent cell through the measurement. Furthermore, the UE may evaluate whether a serving cell management condition is satisfied based on the obtained measurement quality. In this example, it is assumed that the measurement quality result for the cell 2 satisfies the second condition for addition that belongs to the serving cell management condition.

The UE adds the cell 2 that has satisfied the second condition as a serving cell (S1432). Accordingly, the cell 2 may operate as an SCell.

The UE sends a serving cell management report message to the network (S1433). The serving cell management report message may be implemented through transmission to the cell 1, that is, the PCell of the UE.

The serving cell management report message may include information indicating that the cell 2 has been added as the serving cell. To this end, the serving cell management report message may include information the ID of the cell 2. The serving cell management report message may further include information indicative of a serving cell management execution reason. The serving cell management report message transmitted at step S1433 may include information indicating that the cell 2 has been added due to the measurement quality of the cell 2.

The UE performs measurement and evaluation on the serving cells (S1441). The UE may obtain the measurement quality (e.g., RSRQ, RSRP and/or a CQI) of the serving cells through the measurement. Furthermore, the UE may evaluate whether the serving cell management condition is satisfied based on the obtained measurement quality. In this example, it is assumed that the measurement quality result of the cell 2, that is, an SCell, satisfies the first condition for deletion that belongs to the serving cell management condition.

The UE deletes the cell 2 that has satisfied the first condition from the serving cell (S1442).

The UEs sends a serving cell management report message to the network (S1443). The serving cell management report message may be implemented through transmission to the cell 1, that is, the PCell of the UE.

The serving cell management report message may include information indicating that the cell 2 has been deleted from the serving cell. To this end, the serving cell management report message may include information about the ID of the cell 2. The serving cell management report message may further include information indicative of a serving cell management execution reason. The serving cell management report message transmitted at step S1443 may include information indicating that the cell 2 has been deleted due to measurement quality of the cell 2.

The UE performs measurement and evaluation on the serving cell and an adjacent cell (S1451). The UE may obtain the measurement quality (e.g., RSRQ, RSRP and/or a CQI) of the serving cell and/or the adjacent cell through the measurement. Furthermore, the UE may evaluate whether the serving cell management condition is satisfied based on the obtained measurement quality. In this example, it is assumed that measurement quality result of the cell 3 satisfies the second condition for addition that belongs to the serving cell management condition.

The UE adds the cell 3 that has satisfied the second condition as a serving cell (S1452). Accordingly, the cell 3 may operate as an SCell.

The UE sends a serving cell management report message to the network (S1453). The serving cell management report message may be implemented through transmission to the cell 1, that is, the PCell of the UE.

The serving cell management report message may include information indicating that the cell 3 has been added as a serving cell. To this end, the serving cell management report message may include information about the ID of the cell 3. The serving cell management report message may further include information indicative of a serving cell management execution reason. The serving cell management report message transmitted at step S1453 may include information indicating that the cell 2 has been added due to the measurement quality of the cell 3.

In accordance with a communication method, such as that of FIG. 14, UE is provided with service from at least one serving cell, but may autonomously manage serving cells that provide the service through measurement and evaluation.

Figure 15:
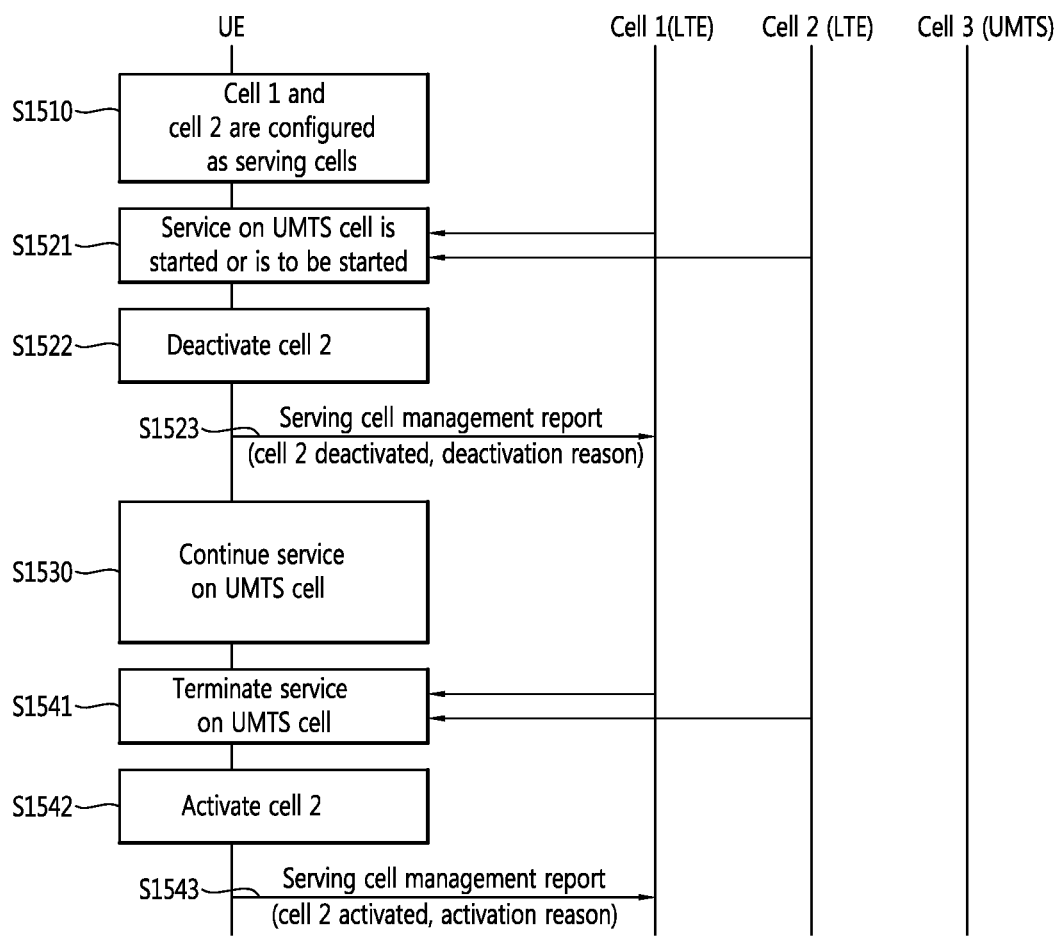
FIG. 15 is a diagram illustrating another example of a communication method based on autonomous serving cell management in accordance with an embodiment of the present invention.

FIG. 15 is a diagram illustrating another example of a communication method based on autonomous serving cell management in accordance with an embodiment of the present invention.

In this example, it is assumed that a cell 1 and a cell 2 capable of providing service to UE are cells based on UE and a cell 3 is a cell based on a UMTS.

Referring to FIG. 15, the UE configures the cell 1 and the cell 2 as serving cells and operates (S1510). In this case, it is assumed that the cell 1 operates as a PCell and the cell 2 operates as an SCell. The UE may be provided with LTE-based service through the cell 1 and the cell 2.

While in operation, the UE checks that service on the UMTS cell is started or is to be started (S1521). This may be performed by obtaining information indicating that the service on the UMTS cell is started or is to be started from a network or through a UE's autonomous determination. Accordingly, the UE may determine that the first condition, that is, the deletion/deactivation condition of a serving cell, has been satisfied.

The UE deactivates the cell 2, that is, an SCell (S1522).

When the cell 2 is deactivated, the UE sends a serving cell management report message to the network (S1523). The serving cell management report message may be implemented through transmission to the cell 1, that is, the PCell of the UE.

The serving cell management report message may include information indicating that the cell 2 has been deactivated. To this end, the serving cell management report message may include information about the ID of the cell 2. The serving cell management report message may further include information indicative of a serving cell management execution reason. The serving cell management report message transmitted at step S1523 may include information indicating that the cell 2 has been deactivated due to the schedule that the service on the UMTS cell is started or is to be started.

Meanwhile, the UE may maintain the cell 1, that is, a PCell, as an activated serving cell. That is, the autonomous serving cell management of the UE may be configured so that it is applied to only an SCell of one or more serving cells.

The UE continues to be provided with the service on the UMTS cell (S1530).

The UE checks that the provided service on the UMT SCell has been terminated (S1541). This may be performed by receiving information indicating that the service on the UMT SCell has been terminated from the network or through a UE's autonomous determination. Accordingly, the UE may determine that the second condition, that is, the addition/activation condition of a serving cell, has been satisfied.

The UE activates the cell 2, that is, a deactivated SCell (S1542).

When the cell 2 is activated, the UE sends a serving cell management report message to the network (S1543). The serving cell management report message may be implemented through transmission to the cell 1, that is, the PCell of the UE.

The serving cell management report message may include information indicating that the cell 2 has been activated. To this end, the serving cell management report message may include information about the ID of the cell 2. The serving cell management report message may further include information indicative of a serving cell management execution reason. The serving cell management report message transmitted at step S1543 may include information indicating that the cell 2 has been activated due to the termination of the service on the UMTS cell.

In accordance with the aforementioned communication method according to an embodiment of the present invention, UE can autonomously mange serving cells based on a service environment including serving cells and/or adjacent cells. Accordingly, serving cells suitable for providing service to UE can be adaptively configured. Accordingly, further improved and efficient service can be provided to the UE through the configuration of one or more serving cells. Furthermore, UE can autonomously manage serving cells by determining whether service will be provided through another RAT based on the capabilities of the UE. Accordingly, a more efficient network operation is made possible because UE cells can be prevented from being unnecessarily configured as serving cells and waiting when service is provided through another RAT.

Figure 16:
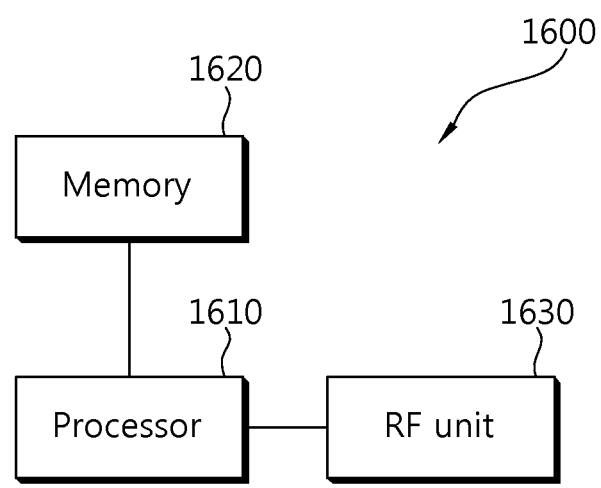
FIG. 16 is a block diagram illustrating a wireless apparatus in which an embodiment of the present invention is implemented.

FIG. 16 is a block diagram illustrating a wireless apparatus in which an embodiment of the present invention is implemented. The apparatus may be configured to implement the communication methods according to the embodiments of the present invention described with reference to FIGS. 13 to 15.

The wireless apparatus 1600 may be implemented as UE, a base station, and a collection network entity for performing a correlation evaluation method in accordance with an embodiment of the present invention.

The wireless apparatus 1600 includes a processor 1610, memory 1620, and a Radio Frequency (RF) unit 1630. The processor 1610 implemented the proposed functions, processes and/or methods. The processor 1610 may be configured to perform the communication method based on autonomous serving cell management in accordance with an embodiment of the present invention. The processor 1610 may be configured to evaluate whether the serving cell management condition is satisfied. The processor 1610 may be configured to manage serving cells based on a satisfied serving cell management condition. The processor 1610 may be configured to make a report to a network in relation to the execution of serving cell management. The processor 1610 may be configured to implement the embodiments of the present invention described with reference to FIGS. 13 to 15.

The RF unit 1630 is connected to the processor 1610 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communication performed by a user equipment (UE) in a wireless communication system, the method comprising:
   determining a serving cell management condition of a specific serving cell;
   managing a serving cell set based on the serving cell management condition; and
   performing communication with at least one serving cell included in the serving cell set,
   wherein the serving cell management condition includes a first condition for deactivation or deletion of the specific serving cell,
   wherein the specific serving cell satisfies the first condition if the specific serving cell is included in the serving cell set and if another Radio Access Technology (RAT), which is unable to simultaneously operate with a RAT for the specific serving cell, is required to operate for the UE, and
   wherein the deactivation indicates that the specific serving cell which is activated is to be deactivated, and the deletion indicates that the specific serving cell which is included in the serving cell set is to be deleted from the serving cell set.

2. The method of claim 1, wherein the serving cell management condition further includes a second condition for activation or addition of the specific serving cell, and
   wherein the activation indicates that the specific serving cell which is deactivated is to he activated, and the addition indicates that the specific serving cell which is not included in the serving cell set is to be added to the serving cell set.

3. The method of claim 1, wherein managing the serving cell set comprises:
   deactivating the specific serving cell in the serving cell set if the specific serving cell satisfies the first condition.

4. The method of claim 1, wherein managing the serving cell set comprises:
   deleting the specific serving cell from the serving cell set if the specific serving cell satisfies the first condition.

5. The method of claim 2, wherein managing the serving cell set comprises:
   activating the specific serving cell in the serving cell set if the specific serving cell satisfies the second condition.

6. The method of claim 2, wherein managing the serving cell set comprises:
   adding the specific serving cell to the serving cell set if the specific serving cell satisfies the second condition.

7. The method of claim 1, wherein if a measurement quality of the specific serving cell is equal to or smaller than a specific threshold, the specific serving cell satisfies the first condition.

8. The method claim 1, wherein if a measurement quality of the specific serving cell is equal to or smaller than a measurement quality of another serving cell in the serving cell set by a specific offset, the specific serving cell satisfies the first condition.

9. The method of claim 1, wherein the at least one serving cell is at least one cell configured to provide a service on a basis of a carrier aggregation (CA).

10. The method of claim 2, wherein if a measurement quality of the specific serving cell is equal to or higher than a specific threshold, the specific serving cell satisfies the second condition.

11. The method of claim 2, wherein if a measurement quality of the specific serving cell is equal to or higher than a measurement quality of another serving cell in the serving cell set by a specific offset, the specific serving cell satisfies the second condition.

12. The method of claim 2, wherein if an operation of the another Radio Access Technology (RAT) is stopped for service for the UE, the second condition is satisfied.

13. The method of claim 2, further comprising:
   sending, to a network, a serving cell management report message according to managing the serving cell set,
   wherein the serving cell management report message comprises information about an ID of at least one serving cell whose state has been changed on a basis of managing the serving cell set and information indicating a management reason for the serving cell set.

14. The method of claim 1., wherein:
   if a plurality of serving cells is included in the serving cell set, the plurality of serving cells comprise a single macro cell and at least one small cell, and
   the method further comprises sending and receiving control information to and from the macro cell and sending and receiving data to and from the at least one small cell.

15. A wireless apparatus comprising:
   a Radio Frequency (RF) unit configured to send and receive radio signals; and
   a processor which is functionally connected to the RF unit and operates,
   wherein the processor is configured to:
      determine a serving cell management condition of a specific serving cell,
      manage a serving cell set based on the serving cell management condition, and
      perform communication with at least one serving cell included in the serving cell set, and
   wherein the serving cell management condition includes a first condition for deactivation or deletion of the specific serving cell,
   wherein the specific serving cell satisfies the first condition if the specific serving cell is included in the serving cell set and if another Radio Access Technology (RAT), which is unable to simultaneously operate with a RAT for the specific serving cell, is required to operate for the UE, and
   wherein the deactivation indicates that the specific serving cell which is activated is to be deactivated, and the deletion indicates that the specific serving cell which is included in the serving cell set is to he deleted from the serving cell set.

* * * * *